(12) United States Patent
Ueyama

(10) Patent No.: US 9,503,005 B2
(45) Date of Patent: Nov. 22, 2016

(54) CONTROL DEVICE AND STEPPING MOTOR CONTROL METHOD

(71) Applicant: CANON KABUSHIKI KAISHA, Tokyo (JP)

(72) Inventor: Teruhiko Ueyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 13/965,812

(22) Filed: Aug. 13, 2013

(65) Prior Publication Data

US 2014/0049200 A1 Feb. 20, 2014

(30) Foreign Application Priority Data

Aug. 20, 2012 (JP) ................................ 2012-181410
Aug. 20, 2012 (JP) ................................ 2012-181411

(51) Int. Cl.
*H02P 23/12* (2006.01)
*H02P 8/14* (2006.01)
*H02P 8/18* (2006.01)

(52) U.S. Cl.
CPC .. *H02P 8/14* (2013.01); *H02P 8/18* (2013.01)

(58) Field of Classification Search
CPC ........................................................ H02P 6/06
USPC .................................................. 318/400.14
See application file for complete search history.

(56) References Cited

U.S. PATENT DOCUMENTS 4,963,808 A 10/1990 Torisawa et al.
6,879,346 B2 4/2005 Chou
8,059,499 B2 11/2011 Nirasawa
2003/0178965 A1* 9/2003 Kuwano et al. ............... 318/685
2007/0216335 A1* 9/2007 Takemori et al. ............ 318/685

(Continued)

FOREIGN PATENT DOCUMENTS

JP 63-092297 A 4/1988
JP 04-145895 A 5/1992
JP 07-312895 A 11/1995

(Continued)

OTHER PUBLICATIONS

The above patent documents were cited in the May 2, 2016 Japanese Office Action, which is enclosed with an English Translation, that issued in Japanese Patent Application No. 2012181411.

(Continued)

*Primary Examiner* — Erick Glass
(74) *Attorney, Agent, or Firm* — Cowan, Liebowitz & Latman, P.C.

(57) ABSTRACT

A motor control device includes a drive unit configured to rotate a rotor by supplying a drive signal with periodical changes to a coil; a detection unit configured to output a signal that is changed in association with a rotation of the rotor; and a control unit configured to control the drive signal supplied by the drive unit in accordance with the signal output from the detection unit, wherein the control unit performs a first control and a second control so as to achieve a target rotation velocity of the rotor, and wherein the first control is a control for controlling the rotation velocity of the rotor by controlling an advance angle of the drive signal with periodical changes and the second control is a control for controlling the rotation velocity of the rotor by controlling a voltage for supplying the drive signal.

35 Claims, 9 Drawing Sheets

(56) References Cited

U.S. PATENT DOCUMENTS

2009/0097021 A1* 4/2009 Ona et al. .................... 356/301
2011/0074327 A1* 3/2011 Paintz et al. ............ 318/400.35

FOREIGN PATENT DOCUMENTS

| JP | 2007-181353 A | 7/2007 |
| JP | 2009-223952 A | 10/2009 |
| JP | 2011-239599 A | 11/2011 |

OTHER PUBLICATIONS

The documents cited herein were cited in the May 31, 2016 Japanese Office Action, which is enclosed without an English Translation, that issued in Japanese Patent Application No. 2012181410.

* cited by examiner

CONTROL DEVICE AND STEPPING MOTOR CONTROL METHOD

BACKGROUND OF THE INVENTION

Field of the Invention

The present invention relates to a control device and a stepping motor control method.

Description of the Related Art

There have been proposed various methods for driving a stepping motor which is installed in optical equipment such as an imaging apparatus or the like. The stepping motor readily achieves high resolution with open loop control by a micro step drive which uses a sine wave as a control waveform. Thus, in general, there has been proposed a method for driving a stepping motor with open loop control.

On the other hand, a stepping motor may undesirably be stepped-out upon high velocity rotation. Thus, there has been proposed an advance angle control technique for rotating a stepping motor at high velocity without step-out by providing a rotation position detection mechanism to the stepping motor so as to advance the phase of a control waveform by a predetermined angle.

For example, U.S. Pat. No. 4,963,808 discloses a control technique in which two types of operation modes, i.e., a stepping mode using as a two-phase stepping motor and a closed loop mode using as a DC motor can be switchably used by a control unit. Also, U.S. Pat. No. 6,879,346 discloses a technique in which the maximum velocity corresponding to an advance angle used by closed loop control is measured in advance and then the advance angle is controlled by using the measured data so as to control a motor at any velocity.

However, in the technique for controlling the velocity of a stepping motor at any velocity by advance angle control, responsiveness and linearity upon changing an advance angle may be poor in actual usage. Thus, conventionally, in order to perform closed loop control using an advance angle, an advance angle corresponding to a velocity needs to be individually measured and stored in an apparatus in advance so as to calculate an advance angle corresponding to a target velocity based on the result of measurement by taking into consideration the effect of variance such as motor properties, the mechanism load connected to a motor, or the like.

Here, in an imaging apparatus that performs automatic focusing an imaging sensor, the rotation velocity of a stepping motor for controlling a focus adjusting lens is determined depending on the focal depth of a lens and the frame rate of an imaging sensor. Since the velocity of a stepping motor required for the above control differs depending on the focal distance of a lens, the condition of an object, or the like, the stepping motor needs to be accurately controlled at any velocity. When conventional advance angle control is applied to an apparatus (e.g., imaging apparatus) in which a stepping motor needs to be controlled at any constant velocity, all the advance angle measurement data depending on the drive velocity of the apparatus must be stored in the same in advance. Thus, in an apparatus in which a stepping motor needs to be controlled at any constant velocity, advance angle control is rarely used.

SUMMARY OF THE INVENTION

The present invention provides a control device that accurately controls the advance angle of a stepping motor at any velocity without storing all measurement data of a velocity and an advance angle.

According to an aspect of the present invention, a motor control device is provided that includes a drive unit configured to rotate a rotor by supplying a drive signal with periodical changes to a coil; a detection unit configured to output a signal that is changed in association with a rotation of the rotor; and a control unit configured to control the drive signal supplied by the drive unit in accordance with the signal output from the detection unit, wherein the control unit performs a first control and a second control so as to achieve a target rotation velocity of the rotor, and wherein the first control is a control for controlling the rotation velocity of the rotor by controlling an advance angle of the drive signal with periodical changes and the second control is a control for controlling the rotation velocity of the rotor by controlling a voltage for supplying the drive signal.

The control device of the present invention controls the advance angle of a stepping motor based on correspondence information between an advance angle and a drive velocity in a range of a predetermined drive velocity. Thus, according to the present invention, a control device that performs advance angle velocity control at any specified velocity with high accuracy without storing all measured values of the advance angle and the drive velocity may be provided.

Further features of the present invention will become apparent from the following description of exemplary embodiments with reference to the attached drawings.

DESCRIPTION OF THE EMBODIMENTS

Figure 1:
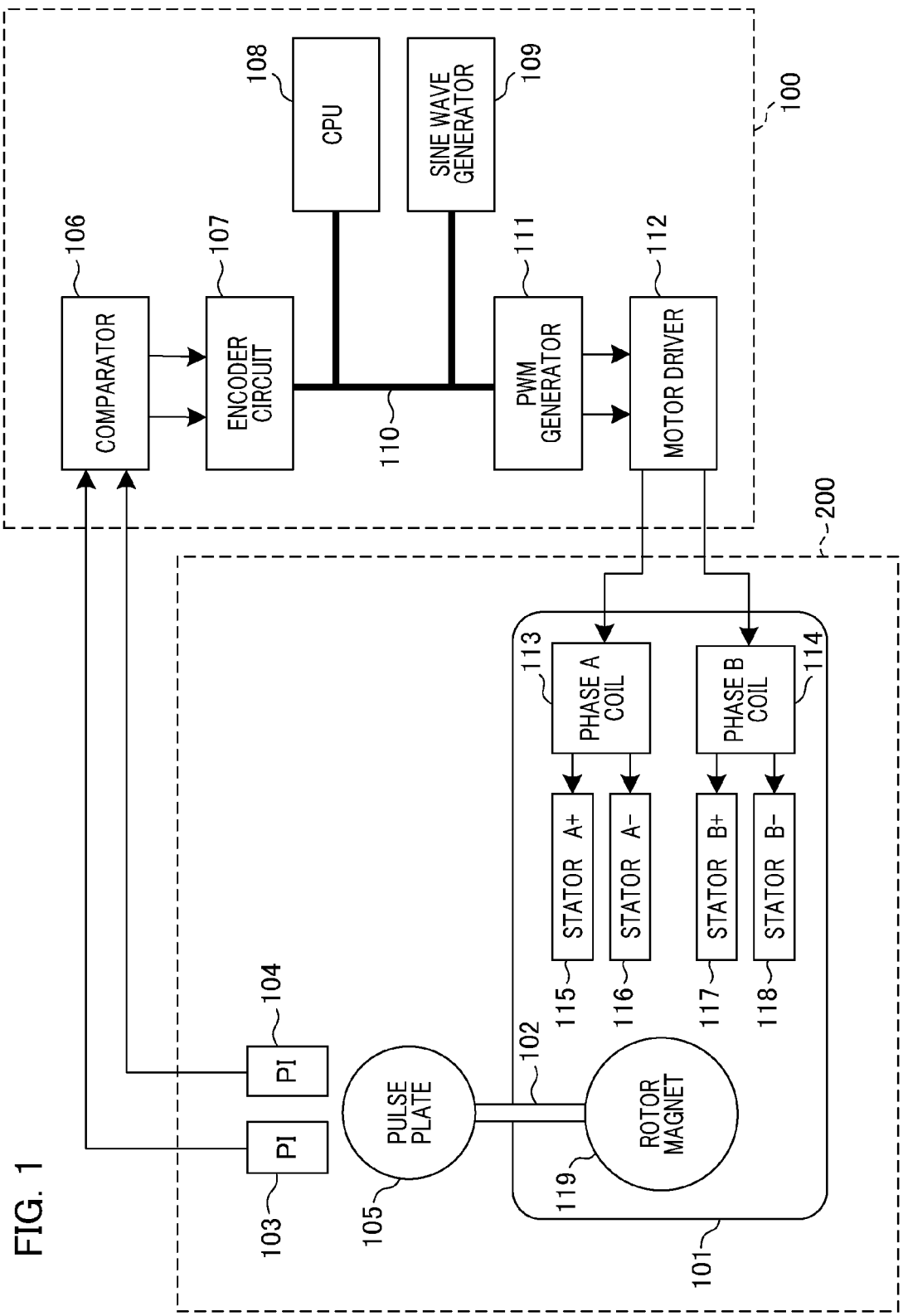
FIG. 1 is a diagram illustrating an exemplary configuration according to the present embodiment.

FIG. 1 is a diagram illustrating an exemplary configuration according to the present embodiment. A control device 100 is a device that controls a stepping motor unit 200. The control device 100 controls the rotation of a stepping motor 101 by detecting the rotation position of the stepping motor 101. The control device 100 has a function that performs advance angle control using advance angle data depending on a rotation velocity and a function that performs velocity control using a drive voltage. More specifically, the stepping motor unit 200 includes a stepping motor 101, a rotor 102, a pulse plate 105, and photo interrupters (hereinafter referred to as "PI") 103 and 104.

Figure 2:
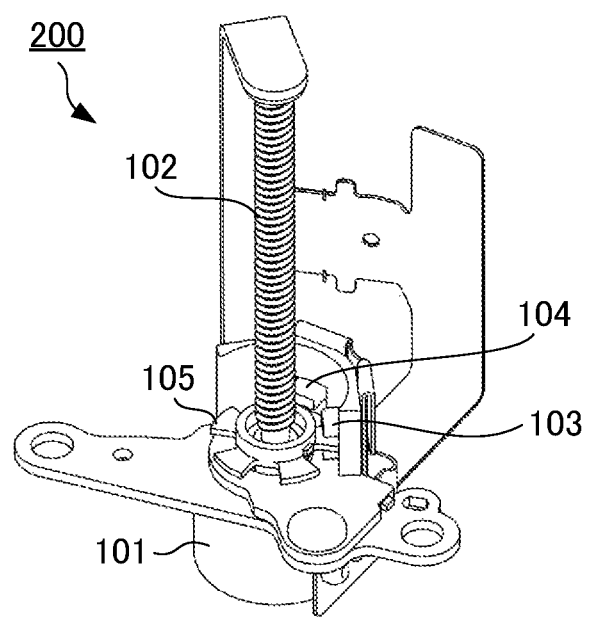
FIG. 2 is a diagram illustrating a configuration of a stepping motor unit.

FIG. 2 is a diagram illustrating a configuration of a stepping motor unit. The stepping motor unit 200 has a position detection function. A description will be given by taking an example of an encoder in which the rotor 102 of the stepping motor 101 provided in the stepping motor unit 200 is provided with the pulse plate 105. The pulse plate 105 is designed such that the ratio of light region to dark region is 50:50. Two PIs 103 and 104 are attached at mechanically designed positions, and the pulse plate 105 changes the output signal of PIs in association with the rotation of the rotor 102. Here, a two-phase encoder is configured by combining the PIs 103 and 104 and the pulse plate 105.

Referring back to FIG. 1, the control device includes a comparator 106, an encoder circuit 107, a CPU 108, a sine wave generator 109, a PWM generator 111, and a motor driver (a drive unit) 112. The comparator 106 inputs the analog signals output from the PIs 103 and 104, and then outputs the signals digitized by a set threshold value voltage to the subsequent stage. In other words, the comparator functions as a generation unit that generates a detection signal at the rotation position of a rotor which is the rotation unit of a stepping motor. Each of the digitized signals of signals input from the photo interrupters is input to the encoder circuit 107 to thereby acquire a signal rise timing and a signal fall timing. In accordance with the timing, the encoder circuit 107 performs motor position count and signal cycle count.

Also, the encoder circuit 107 causes the CPU 108 to perform interrupt processing at the input timing of signals. The CPU 108 has a function that executes programs stored in advance, and executes the programs in sequence in accordance with interrupt processing. Also, the CPU 108 controls the encoder circuit 107, the sine wave signal generator 109, and the PWM generator 111 via a bus 110. The sine wave generator 109 sends a PWM value at a resolution corresponding to one cycle of the sine wave to the PWM generator 111 in accordance with an instruction given by the CPU 108. Then, the motor driver 112 amplifies a PWM signal output from the PWM generator 111 to thereby transmit the amplified PWM signal to the stepping motor 101.

The motor driver 112 controls an output voltage by a PWM DUTY ratio (%), and effectively applies a sine wave-shaped voltage signal to a motor coil. Hereinafter, assumption is made that a voltage applied to a coil is a sine wave for ease of explanation. The rotation velocity of the stepping motor 101 is controlled by the application of the sine wave-shaped voltage signal. In other words, the CPU 108, the sine wave generator 109, the PMW generator 111, and the motor driver 112 function as a motor control unit that controls the rotation velocity of a stepping motor at a timing in response to the detection signal of the rotor.

A phase A coil 113 and a phase B coil 114 provided in the stepping motor 101 receive a sine wave signal generated by the motor driver 112. Then, the phase A coil 113 and the phase B coil 114 generate four sine wave voltages having a different phase on the subsequent stages that are a stator A+ 115, a stator A− 116, a stator B+ 117, and a stator B− 118. When a sine wave is output to the phase A coil 113 and a cosine wave is output to the phase B coil 114, the waveform of the phase B becomes a waveform having a phase advance the phase A by 90 degrees so that the motor is rotated in the forward direction, whereas the phase A becomes a waveform having a phase behind the phase B by 90 degrees so that the motor is rotated in the backward direction.

Hereinafter, a description will be given of the case where the pulse plate 105 of the encoder is attached to a rotor magnet 119 such that the light/dark phase of the pulse plate 105 matches the magnetization phase of the rotor magnet 119. If the phase shift amount between the magnetization phase of the rotor magnet 119 and the light/dark phase of the pulse plate 105 of the encoder is known in advance, the same control can be performed in consideration of the phase shift amount.

Figure 3:
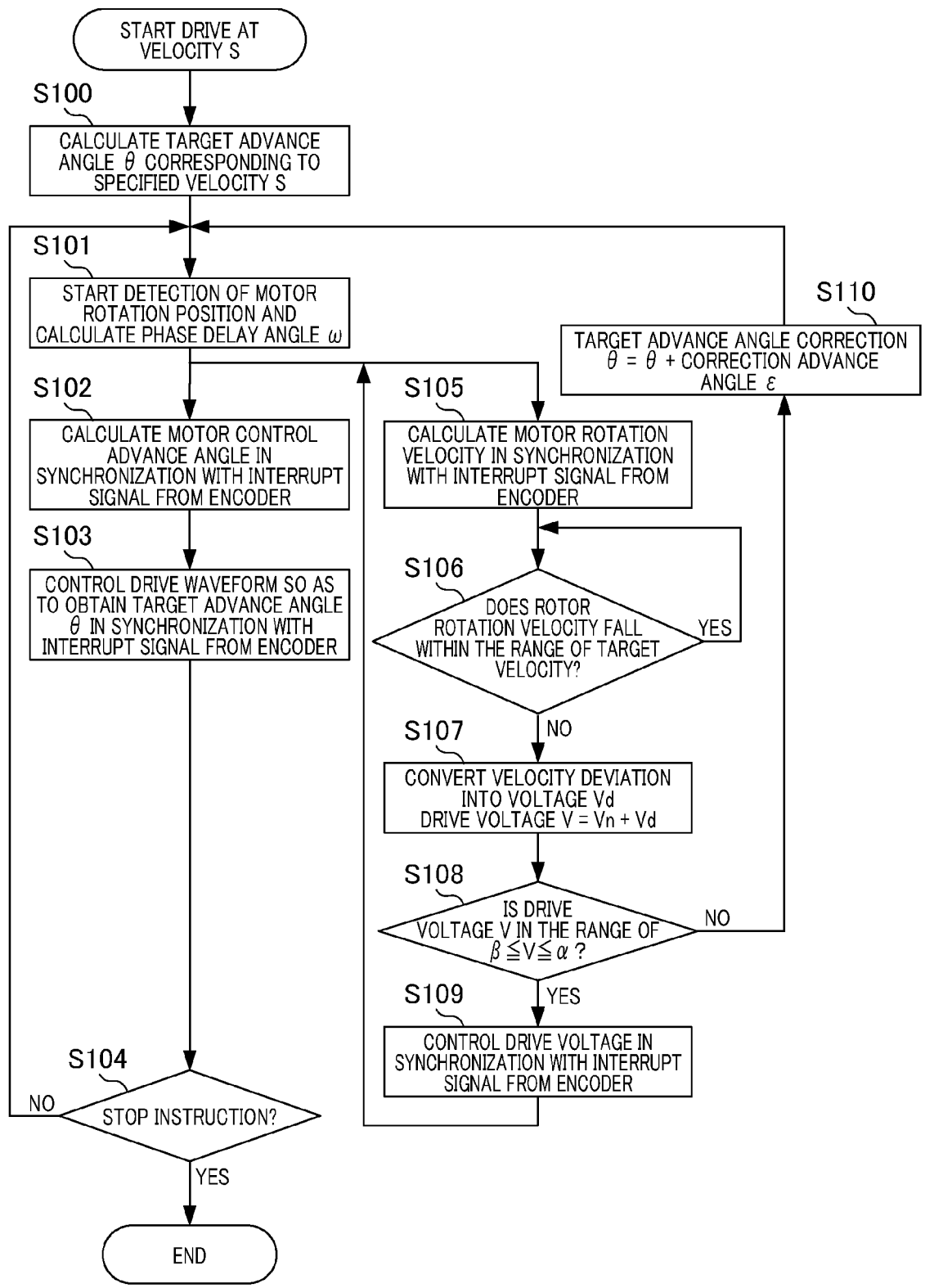
FIG. 3 is a flowchart illustrating stepping motor advance angle control processing.

FIG. 3 is a flowchart illustrating stepping motor advance angle control processing performed by the control device of the present embodiment. Assume that the stepping motor 101 is rotated at the specified velocity S. The CPU 108 calculates the target advance angle θ corresponding to the specified velocity S (step S100).

Figure 4A:
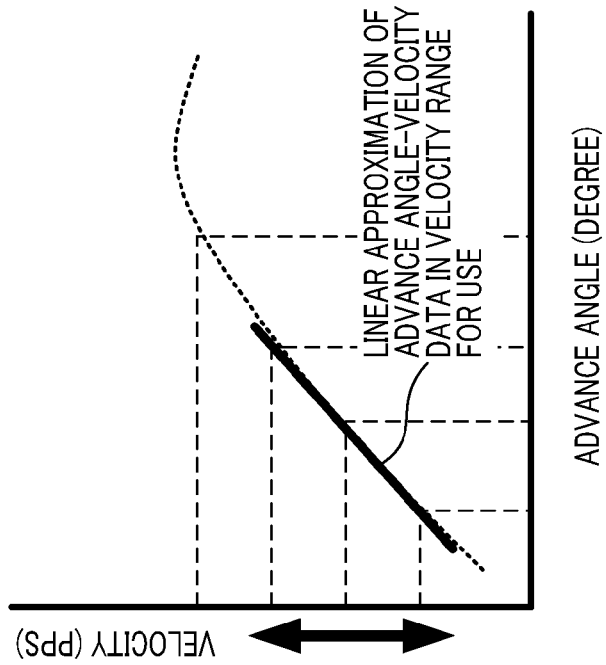
FIGS. 4A and 4B are diagrams illustrating target advance angle calculation processing.
Figure 4B:
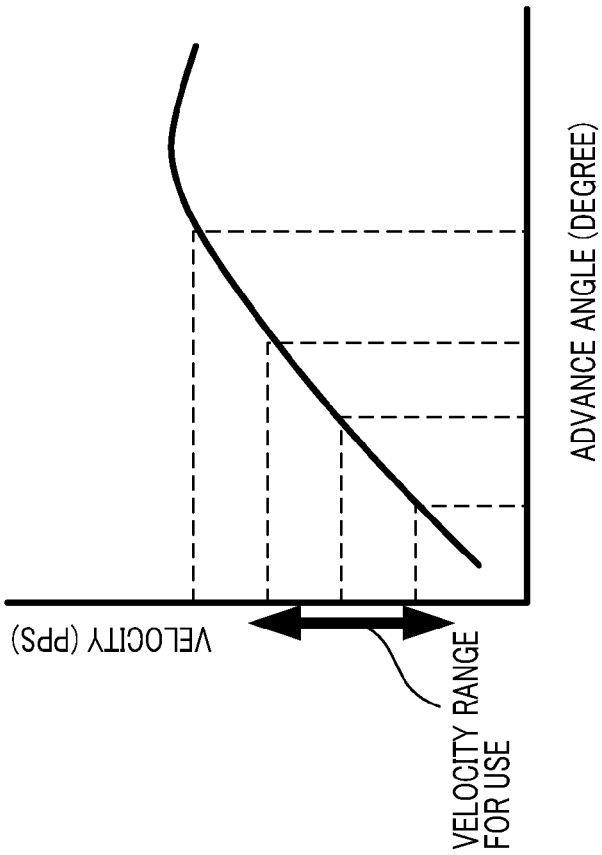

FIGS. 4A and 4B are diagrams illustrating target advance angle calculation processing in step S100 shown in FIG. 3. FIG. 4A is a graph illustrating the relationship between the advance angle and the velocity of the motor at a predetermined drive voltage. The trajectory indicating the relationship between the advance angle and the velocity of the motor on the graph is described below as "advance angle-velocity characteristic curve". When the advance angle is reduced toward the left direction on the horizontal axis of the graph, the drive velocity is also reduced. Also, when the advance angle is increased toward the right direction on the horizontal axis of the graph, the drive velocity is also increased. However, if the advance angle is increased greater than a predetermined advance angle, the drive velocity is reduced.

If correspondence information (advance angle-velocity data) indicating a correspondence relationship between the advance angle and the velocity of the motor is measured and tabulated so as to be stored in the control device, the target advance angle value can be calculated even when the stepping motor is driven at any specified velocity. However, the tabulated advance angle-velocity data is stored, the amount of data increases.

Accordingly, the control device of the present embodiment stores advance angle-velocity data within the limited velocity range in a storage unit (not shown) to thereby calculate a target advance angle using advance angle-velocity data. In this manner, the amount of data used for target advance angle calculation is reduced.

In the present embodiment, the region of the advance angle-velocity data shown in FIG. 4A exhibiting relatively high linearity is formulated by linear approximation and the obtained mathematical formula data (linear approximation formula) is stored in a storage unit and is used for calculating the target advance angle θ in step S100 shown in FIG. 3. More specifically, the region of the advance angle-velocity data exhibiting high linearity within the controllable range of the drive velocity is formulated by linear approximation and then stored. In other words, the CPU 108 functions as an advance angle calculation unit that calculates the advance angle value of a control waveform corresponding to the specified velocity S as a target advance angle based on correspondence information between the advance angle and the rotation velocity, which is stored in a memory in advance, in a predetermined range of the rotation velocity of the rotor.

Figure 5A:
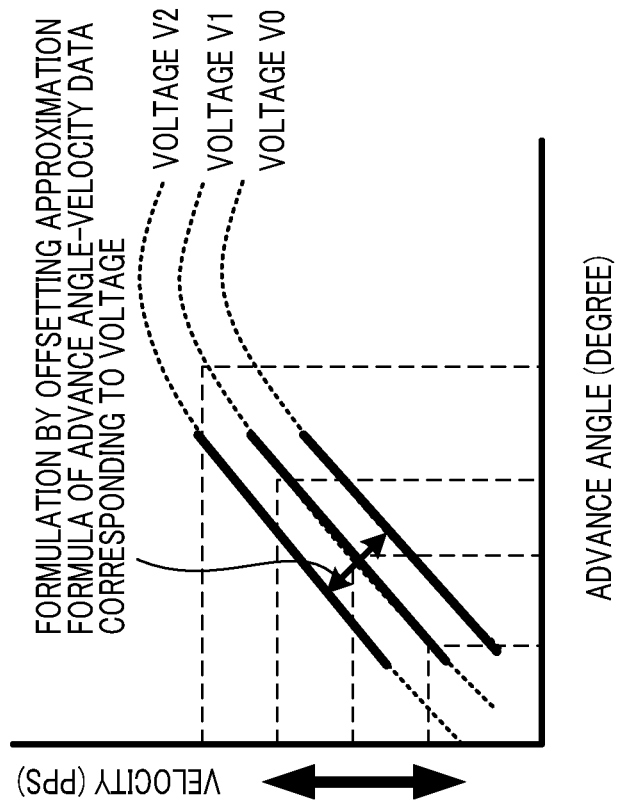
FIGS. 5A and 5B are diagrams illustrating the relationship between an advance angle and a velocity for each drive voltage.
Figure 5B:
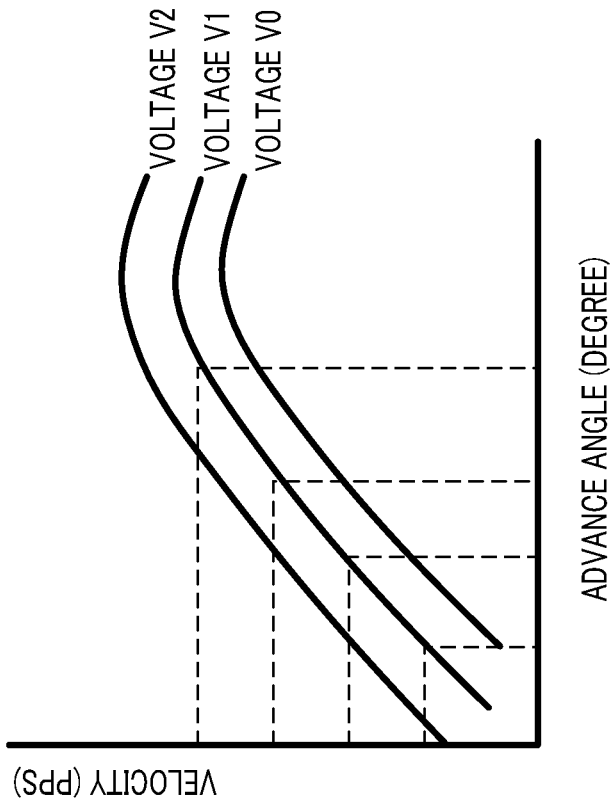

FIGS. 5A and 5B are diagrams illustrating the relationship between an advance angle and a velocity for each drive voltage. FIG. 5A shows advance angle-velocity data measured for each drive voltage. When the drive voltage is changed within a predetermined range, the advance angle-velocity characteristic curve at a voltage of V0 is shifted in accordance with an increase in voltage value from the voltage V0 to a voltage V1 and from the voltage V1 to a voltage V2. When advance angle-velocity data for each drive voltage is tabulated and is stored in a device, a target advance angle value can be calculated even when the stepping motor is driven at any specified velocity at a specified drive voltage. However, when advance angle-velocity data for each drive voltage is tabulated, the amount of data increases.

Accordingly, the control device of the present embodiment stores advance angle-velocity data corresponding to each of a predetermined plurality of drive voltages within the limited velocity range in a storage unit and controls a drive voltage using advance angle-velocity data so as to control the rotation velocity of the motor. In this manner, the amount of data used for controlling the rotation velocity of the motor is reduced. Control of the rotation velocity of the motor is executed in steps S105 and S106 shown in FIG. 3 and the details of which will be described below with reference to FIG. 7.

FIG. 5B is a diagram illustrating an example in which the region of the advance angle-velocity data for each drive voltage shown in FIG. 5A exhibiting relatively high linearity is formulated by linear approximation. As shown in FIG. 4B, although the controllable drive velocity or the settable advance angle is limited, the velocity controllable range or the advance angle controllable range can be expanded by the combination of approximation formulae for advance angle-velocity data with different drive voltages. In other words, the control device of the present embodiment can control the drive velocity of the motor even when a voltage is changed while the advance angle is at a predetermined value or an advance angle is changed while the voltage is at a predetermined value. Also, since the angle-velocity data relationship shifts up and down depending on the drive voltage, the voltage-dependent characteristic can be represented by the intercept of approximation formula. In this manner, the amount of advance angle-velocity data according to voltage can be reduced.

Figure 6:
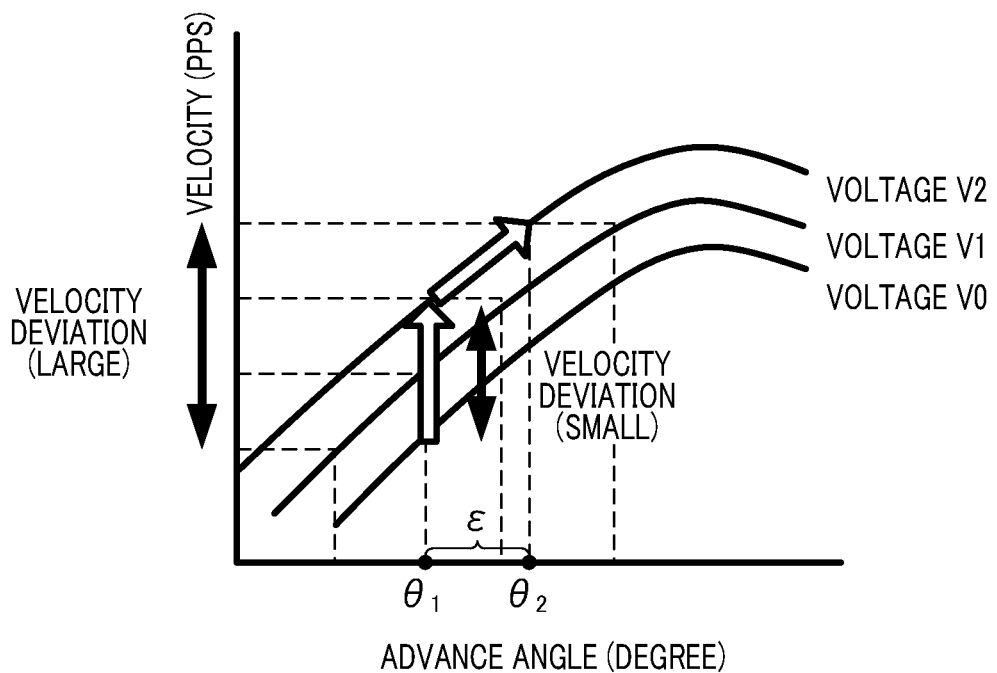
FIG. 6 is a diagram illustrating target advance angle calculation processing.

FIG. 6 is a diagram illustrating target advance angle calculation processing in step S100 shown in FIG. 3. The graph shown in FIG. 6 shows the relationship between the advance angle and the velocity of the motor for each drive voltage. When the advance angle is reduced toward the left direction on the trajectory, the drive velocity is also reduced. Also, when the advance angle is increased toward the right direction on the trajectory, the drive velocity is also increased.

When the drive voltage is changed on the graph shown in FIG. 6 within a predetermined range, the advance angle-velocity characteristic curve at a voltage of V0 is shifted in accordance with an increase in voltage value from the voltage V0 to a voltage V1 and from the voltage V1 to a voltage V2. The advance angle-velocity data for each drive voltage is tabulated and stored in the storage unit of the control device in advance. Advance angle-velocity data is correspondence information between the advance angle and the velocity of the motor. The CPU 108 calculates the target advance angle θ corresponding to the specified velocity S based on advance angle-velocity data. In this manner, even when the motor is driven at any specified velocity, the target advance angle value can be calculated.

When advance angle-velocity data is tabulated and stored, the amount of data increases. Accordingly, advance angle-velocity data within the limited velocity range may be stored in a storage unit (not shown) so that the CPU 108 calculates a target advance angle using the advance angle-velocity data. In this manner, the amount of data used for calculating a target advance angle is reduced.

The region of the advance angle-velocity data shown in FIG. 6 exhibiting relatively high linearity is formulated by linear approximation and the obtained mathematical formula data (linear approximation formula) is stored in a storage unit and may be used for calculating the target advance angle θ in step S100 shown in FIG. 3. More specifically, the region of the advance angle-velocity data exhibiting high linearity within the controllable range of the drive velocity in the advance angle-velocity characteristic curve is formulated by linear approximation and then stored. In other words, the CPU 108 functions as an advance angle calculation unit that calculates the advance angle value of a control waveform corresponding to the specified rotation velocity of the rotor as a target advance angle.

Referring back to FIG. 3, the CPU 108 detects the rotation position of the motor in synchronization with the interrupt signal of the encoder obtained from the encoder circuit 107 to thereby calculate a phase delay angle ω (step S101). The calculated phase delay angle ω occurs due to the counter electromotive force of the motor in rotation or the like.

Next, the CPU 108 sets the phase deviation ω−θ between the phase delay angle ω and the target advance angle θ calculated in step S100 as a control advance angle (step S102). The CPU 108 controls a drive waveform so as to correct the phase deviation ω−θ and controls the advance angle so as to hold the state of the advance angle θ (step S103). More specifically, the CPU 108 controls the waveform phase of the sine wave generator 109 such that the phase of the control waveform is advanced by the phase deviation ω−θ until the timing at which the next interrupt signal from the encoder is generated. In other words, the CPU 108 functions as an advance angle control unit that controls the advance angle of a control waveform so as to be a target advance angle at a timing in response to the detection signal of the rotation position of the rotor.

FIGS. 7A to 7D are diagrams illustrating examples of advance angle control processing in step S103 shown in FIG. 3. FIG. 7A shows the output waveform of a signal from an encoder attached to the rotor shaft 102 of the stepping motor 101. The CPU 108 performs drive waveform phase detection and drive waveform phase control at the timing at which the encoder switches between the light and dark states or between the dark and light states.

FIG. 7B is a diagram illustrating an exemplary drive waveform at the advance angle of 0 degrees. FIG. 7C is a diagram illustrating an exemplary drive waveform obtained when the motor is driven under open loop control, where the phase of the drive waveform is delayed as compared with that of the drive waveform shown in FIG. 7B. FIG. 7D is a diagram illustrating an exemplary drive waveform obtained when open loop control shown in FIG. 7C is switched to advance angle control.

The waveform shown in FIG. 7B indicates an ideal drive waveform (advance angle of 0 degrees) with no current delay. The waveform shown in FIG. 7C indicates a drive waveform under open loop control. Referring to the waveform shown in FIG. 7C, it can be seen that the phase delay Cn occurs at the timing In of switching from light to dark shown in FIG. 7A and the phase delay Cn+1 occurs at the timing In+1 after ¼ cycle.

Figure 7:
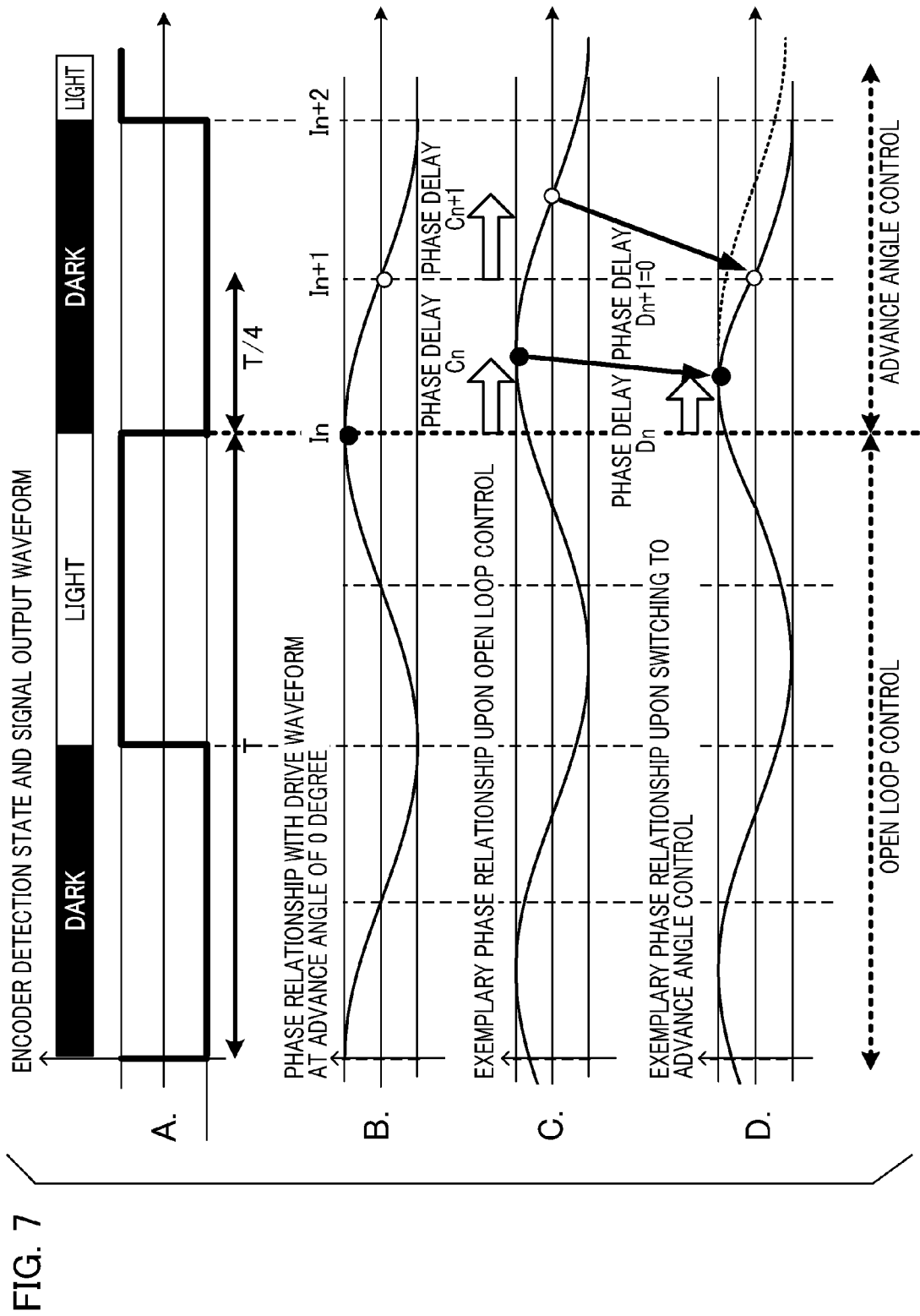
FIGS. 7A to 7D are diagrams illustrating examples of advance angle control processing.

As shown in FIG. 7D, when open loop control is switched to advance angle control at the timing In, the CPU 108 controls the cycle of a control waveform such that the control waveform is in the target phase at the timing (In+1) after ¼ cycle. For example, when the target phase has the advance angle of 0 degrees, the CPU 108 controls the cycle of a control waveform to change it at the period of ¼ cycle such that the phase delay Dn+1 becomes 0 degrees. If the phase of a control waveform is advanced immediately after the timing In, the control waveform may become discontinuous, resulting in occurrence of vibration, noise, and step-out of the motor. Thus, in this example, the CPU 108 performs control such that the phase of the waveform shown in FIG. 7D is aligned with that of the waveform shown in FIG. 7B in a predetermined period (e.g., ¼ cycle) during which no problem arises by controlling the cycle of the control waveform. Although a description has been given by taking an example in which advance angle control is performed so as to obtain the advance angle of 0 degrees with reference to FIG. 7, advance angle control with the advance angle of δ degrees may also be performed when advance angle control is performed such that a phase delay of δ remains.

Referring back to FIG. 3, in the processes in steps S105 to S110 to be described below, the CPU 108 executes velocity control under feedback control of a drive voltage at the same time of execution of the aforementioned advance angle control to thereby control the rotation velocity of the stepping motor 101 so as to obtain the specified velocity S. In this example, an upper limit controllable drive voltage and a lower limit controllable drive voltage are set in advance.

FIGS. 5A and 5B are diagrams illustrating the upper limit and the lower limit of the drive voltage. The stationary drive voltage to be applied when the stepping motor is driven at a target velocity is V0. The voltage V0 is a drive voltage which is the median of the control range of a drive voltage set by the CPU 108. Also, β is the lower limit voltage and α is the upper limit voltage.

Referring back to FIG. 3, the CPU 108 measures the detection interval of an interrupt signal from an encoder, and then calculates the rotation velocity of the stepping motor 101 (step S105). In other words, the CPU 108 functions as a rotation velocity detection unit that detects the rotation velocity of the rotor with the generation cycle of the detection signal of the rotation position of the rotor. Next, the CPU 108 reflects the amount of deviation between the rotation velocity calculated in step S105 and the target velocity S to a drive voltage to thereby control the rotation velocity of the motor through the processing to be described below. In the present embodiment, advance angle feedback control and drive velocity feedback control are performed in synchronization with an interrupt signal from the encoder.

Firstly, the CPU 108 determines whether or not the detected rotation velocity falls within the target velocity range, that is, whether or not a velocity deviation between the detected rotation velocity and the target velocity falls within the range of the threshold value (step S106). When the CPU 108 determines that the detected rotation velocity falls within the target velocity range, the process advances to step S106. When the CPU 108 determines that the detected rotation velocity does not fall within the target velocity range, the CPU 108 converts a velocity deviation from the target velocity into a voltage Vd and reflects the voltage Vd to the preceding drive voltage Vn (step S107). More specifically, the drive voltage is shifted upward by the amount of Vd by setting the drive voltage V=Vn+Vd. In other words, when the velocity deviation does not fall within a range of a predetermined threshold value, the CPU 108 changes the drive voltage to a voltage value of which the velocity deviation falls within a range of a predetermined threshold value with reference to the advance angle-velocity data stored in a storage unit.

Next, the CPU 108 determines whether or not the calculated drive voltage V falls within the limited range of the drive voltage, i.e., β≤V≤α (step S108). When the drive voltage V falls within the limited range of the drive voltage, the CPU 108 determines that a velocity deviation can be controlled within a range of the threshold value by the control (shift) of a drive voltage. Then, the process advances to step S109. Next, the CPU 108 changes a drive voltage to V at a timing at which the next detection signal from the encoder has been detected (step S109). Then, the process returns to step S105 to continue velocity control processing. As described above, the CPU 108 controls the drive voltage V based on a velocity deviation between the drive velocity and the target velocity in synchronization with the detection signal from the encoder to thereby perform velocity control with high accuracy. In other words, the CPU 108 functions as a voltage control unit that controls a drive voltage such that a velocity deviation between the specified rotation velocity of the rotor and the detected rotation velocity falls within a range of the threshold value.

When the drive voltage V does not fall within the limited range of the drive voltage (within a voltage control range), the CPU 108 determines that a velocity deviation cannot be controlled within a range of the threshold value by the control (shift) of a drive voltage. Then, the process advances to step S110. In step S110, the CPU 108 corrects the target advance angle (step S110).

Hereinafter, a description will be given of target advance angle correction processing with reference to FIG. 6. Assumption is made that, in step S100 shown in FIG. 3, the target advance angle θ1 is calculated in response to the target velocity S when the stationary drive voltage is V0. It is also assumed in this example that the upper limit drive voltage β is V2. When the drive voltage is controlled while performing advance angle control at the target advance angle of θ1 and the velocity deviation is small, the velocity deviation can be controlled within a range of the threshold value by shifting (in the example shown in FIG. 5, shifting upward) the drive voltage within a limited range.

However, when the velocity deviation is large and the drive voltage is shifted by the amount of the drive voltage corresponding to the large velocity deviation, the velocity deviation exceeds the limited range of the drive voltage. In other words, even when the drive voltage is raised to the drive voltage V2 which is the upper limit drive voltage, the target velocity cannot be reached. Thus, in this case, the CPU 108 shifts the advance angle on the advance angle-velocity characteristic curve corresponding to a drive voltage (the upper limit drive voltage or the lower limit drive voltage) at the end of the voltage control range to thereby determine the correction value of the advance angle corresponding to the amount of the drive voltage which falls outside the voltage control range.

In this example, the CPU 108 determines the correction value (correction advance angle) ε for the advance angle corresponding to the velocity deviation by shifting the advance angle on the advance angle-velocity characteristic curve corresponding to the voltage V2. Then, the CPU 108 adds the correction advance angle ε to the target advance angle θ1 to thereby correct the target advance angle to θ2. The aforementioned target advance angle correction processing in step S110 shown in FIG. 3 is performed in synchronization with the interrupt signal from the encoder. Then, the process returns to step S101 so as to repeat a series of processing steps.

The control device of the present embodiment controls motor control using an advance angle value corresponding to a drive velocity as well as performs feedback control with drive voltage in order to control a drive velocity with high accuracy. When the velocity deviation cannot be controlled only by a drive voltage, the control device corrects an advance angle while holding the drive voltage to the upper limit voltage or the lower limit voltage. In other embodiments, the control device may also hold a drive voltage to any predetermined drive voltage and shift an advance angle on the advance angle-velocity characteristic curve corresponding to the drive voltage to thereby determine the correction value of the advance angle. For example, the control device may also shift an advance angle on the advance angle-velocity characteristic curve corresponding to the stationary drive voltage V0 to thereby determine the correction value of the advance angle.

Figure 8:
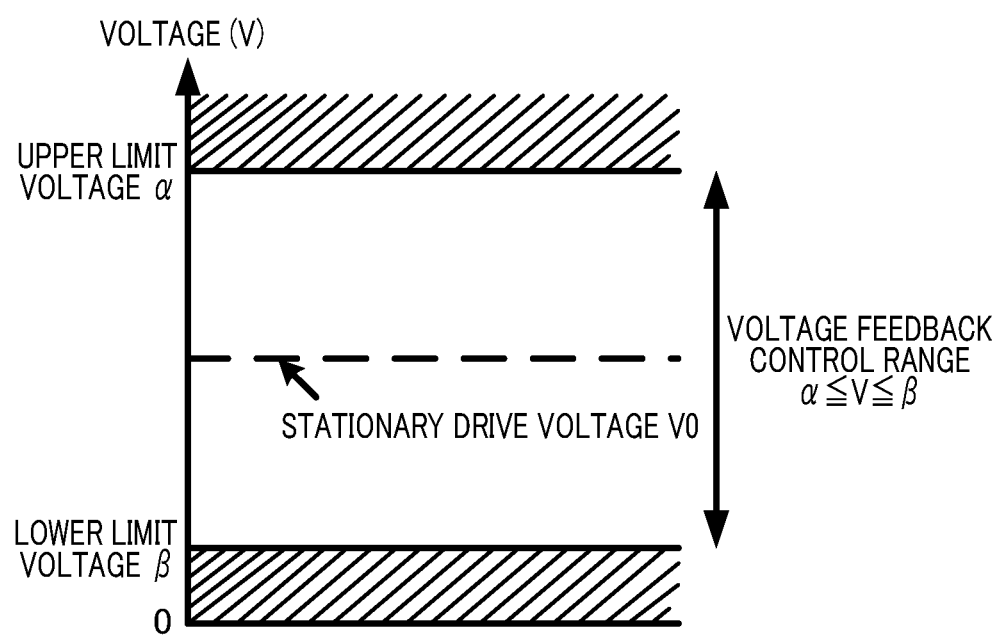
FIG. 8 is a diagram illustrating an example of velocity control by voltage feedback.

FIG. 8 is a diagram illustrating an example of velocity control with voltage feedback. The stationary drive voltage to be applied when the stepping motor is driven at a predetermined target velocity is V0. The voltage V0 is a drive voltage which is the median of the control range of a drive voltage set by the CPU 108. In this example, mathematical formula data corresponding to advance angle-velocity data at a voltage of V0 is stored in a storage unit. The CPU 108 extracts mathematical formula data corresponding to advance angle-velocity data at the drive voltage V0 from the storage unit.

The CPU 108 calculates an advance angle value corresponding to the target velocity based on the extracted mathematical formula data. When the CPU 108 performs advance angle control so as to achieve the calculated advance angle, the motor rotates at a velocity near the target velocity at the stationary drive voltage V0. At this time, the actual motor drive velocity is calculated in step S105 shown in FIG. 3. When there is a deviation between the actual motor drive velocity and the target velocity, the drive velocity is controlled by changing a drive voltage (step S106). In other words, the CPU 108 functions as a voltage control unit that controls a drive voltage such that a velocity deviation between the specified velocity S and the rotation velocity calculated in step S105 falls within a range of a predetermined threshold value.

Here, when motor velocity control is performed by a drive voltage, a limit range is set on a drive voltage for reasons of power design of systems or the like. In the example shown in FIG. 8, the upper limit voltage is denoted by α and the lower limit voltage is denoted by β. The CPU 108 controls the motor so as to obtain the target velocity while changing the drive voltage in a range between α and β. As described above, the control device of the present embodiment can perform velocity control at any velocity at a high speed drive mode which cannot be achieved by open loop control by performing advance angle control and velocity control with voltage in combination. Furthermore, since variation such as an environmental temperature, an individual difference, or the like can also be absorbed within a voltage control range, highly accurate velocity control which is difficult to realize only by using advance angle-velocity data obtained by actual measurement can be achieved.

Referring back to FIG. 3, the CPU 108 determines whether or not there is a stop instruction (step S104). When there is no stop instruction, the process returns to step S101 so as to repeat a series of processing steps. When there is a stop instruction, the CPU 108 stops the stepping motor 101.

Figure 9:
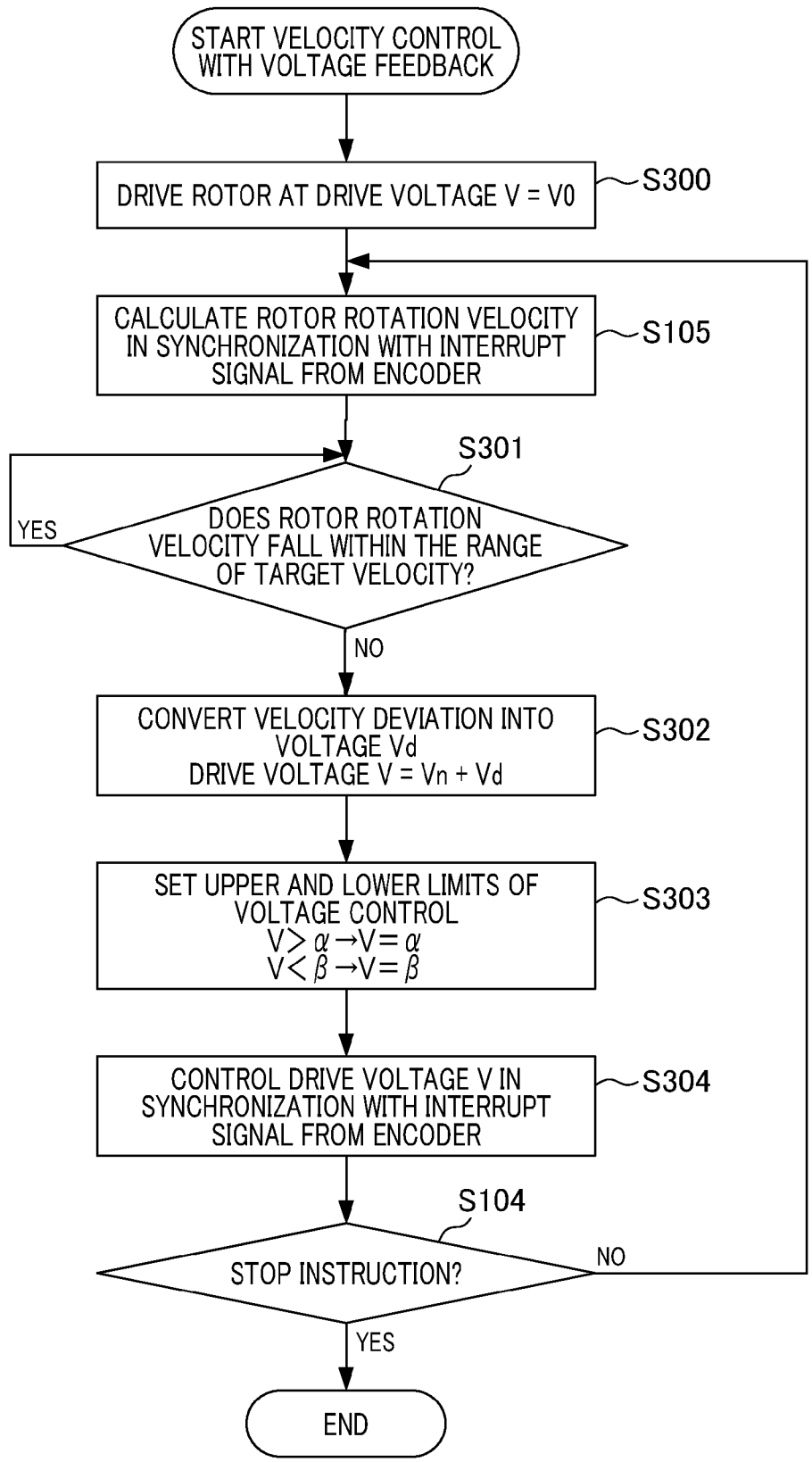
FIG. 9 is a flowchart illustrating a detailed example of drive voltage control processing.

FIG. 9 is a flowchart illustrating a detailed example of drive voltage control processing according to the present embodiment. The processes in steps S104 and S105 shown in FIG. 9 are the same as those in steps S104 and S105 shown in FIG. 3.

Firstly, the CPU 108 starts to drive the motor at the stationary drive voltage V0 (step S300). Next, the CPU 108 calculates the drive velocity of a rotor 119 from the detection interval of a detection signal from an encoder attached to the motor (step S105).

Next, the CPU 108 determines whether or not the detected rotation velocity of the rotor falls within the target velocity range, that is, a velocity deviation between the detected rotation velocity of the rotor and the target velocity falls within a range of the threshold value (step S301). When the CPU 108 determines that the detected rotation velocity of the rotor falls within the target velocity range, the CPU 108 continues to monitor the drive velocity of the rotor in a period during which the next detection signal from the encoder is detected. When the CPU 108 determines that the detected rotation velocity of the rotor does not fall within the target velocity range, the CPU 108 converts a velocity deviation from the target velocity into a voltage Vd and reflects the voltage Vd to the preceding drive voltage Vn (step S302). More specifically, the drive voltage V=Vn+Vd is set. In other words, when the velocity deviation does not fall within a range of a predetermined threshold value, the CPU 108 changes the drive voltage to a voltage value of which the velocity deviation falls within a range of a predetermined threshold value with reference to the advance angle-velocity data stored in a storage unit.

Next, the CPU 108 determines whether or not the calculated drive voltage V falls within the limited range of the drive voltage. When the drive voltage V is greater than the upper limit voltage α, the drive voltage is set to α, whereas when the drive voltage V is less than the lower limit voltage β, the drive voltage is set to β (step S303).

Next, the CPU 108 changes the calculated drive voltage V at a timing at which the next detection signal from the encoder has been detected (step S304). Furthermore, the CPU 108 repeats a series of operations for determining a velocity deviation from the target velocity based on the drive velocity in a period during which the next detection signal from the encoder is detected so as to perform velocity control with drive voltage. When there is a stop instruction, the CPU 108 stops the motor by interrupting energization from the motor driver to the motor (YES in step S104). As described above, the control device of the present embodiment can perform advance angle velocity control at any velocity with high accuracy without storing all measured values of the advance angle and the drive velocity.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-181411 filed on Aug. 20, 2012 and Japanese Patent Application No. 2012-181410 filed Aug. 20, 2012, which are hereby incorporated by reference herein in their entirety.

What is claimed is:

1. A motor control device comprising:
a drive unit configured to rotate a rotor by supplying a drive signal with periodical changes to a coil;
a detection unit configured to output a signal according to a rotation of the rotor; and
a control unit configured to control the drive signal supplied by the drive unit,
wherein the control unit performs a first control and a second control, in accordance with the rotation detected by the detection unit, and
wherein the first control is a feedback control of an advance angle of the drive signal based on the signal output from the detection unit and the second control is a feedback control of an amplitude of the drive signal based on the signal output from the detection unit, and a feedback to the drive signal in the first control is slower than a feedback to the drive signal in the second control.

2. The control device according to claim 1, wherein the control unit performs the first control and the second control in parallel so as to achieve the target rotation of the rotor.

3. The control device according to claim 1, wherein the control unit performs the first control based on correspondence information between the advance angle and the rotation, which is stored in a storage unit in advance.

4. The control device according to claim 2, wherein the correspondence information in a predetermined range of the rotation is information corresponding to a drive voltage which is a median of a control range of a drive voltage set by the control unit.

5. The control device according to claim 1, wherein the control unit controls a drive voltage supplied by the drive unit based on a velocity deviation of the rotation detected by the detection unit.

6. The control device according to claim 1, wherein the correspondence information in the predetermined range of the rotation is mathematical formula data indicating a correspondence relationship between the advance angle and the rotation.

7. The control device according to claim 1, wherein the correspondence in the predetermined range of the rotation is a trajectory indicating a correspondence relationship between the advance angle and the rotation on a graph indicating the relationship between the advance angle and the rotation, and
wherein the mathematical formula data is linear approximation formula calculated on the basis of the trajectory.

8. The control device according to claim 1, wherein control unit performs the second control within predetermined range of voltage.

9. The control device according to claim 5, wherein the storage unit stores the correspondence information corresponding to each a predetermined plurality of drive voltages, and
wherein, when the velocity deviation does not fall within a range of a predetermined threshold value, the control unit changes the drive voltage to a voltage value that the velocity deviation falls within the range of the threshold value with reference to the correspondence information stored in the storage unit.

10. An optical apparatus comprising:
the control device according to claim 1; and
an optical member.

11. An imaging apparatus comprising:
the control device according to claim 1; and
a sensor.

12. The control device according to claim 1, wherein the detection unit detects a velocity of the rotor in accordance with a signal that is signal that changed in association with the rotation of the rotor.

13. The control device according to claim 1, wherein the detection unit detects a velocity of the rotor in accordance with output signals from photo interrupters, wherein the photo interrupters detect s signal that is changed in association with the rotation of the rotor.

14. The control device according to claim 1, wherein the second control is a control of a voltage of the drive signal.

15. The control device according to claim 1, further comprising:
a second detection unit configured to detect a rotation velocity of the rotor in according to the signal output the detection unit.

16. The control device according to claim 1, wherein the second control controls amplitude of the drive signal based on a difference between the rotation velocity detected by the detection unit and the target rotation velocity.

17. A method for controlling a motor control device, the method comprising:
rotating, by a drive unit, a rotor by supplying a drive voltage with periodical changes to a coil;
outputting, by a detection unit, a signal according to a rotation of the rotor; and
controlling, by a control unit, the drive voltage supplied by the drive unit,
wherein the control unit performs a first control and a second control, and
wherein the first control is a feedback control of an advance angle of the drive voltage based on the signal output from the detection unit and the second control is a feedback control of an amplitude of the drive voltage based on the signal output from the detection unit, and a feedback to the drive voltage in the first control is slower than a feedback to the drive voltage in the second control.

18. A motor control device comprising:
a drive unit configured to rotate a rotor by supplying a drive signal with periodical changes to a coil;
a detection unit configured to output a signal according to a rotation of the rotor; and
a control unit configured to control the drive signal supplied by the drive unit,
wherein the control unit performs a first control and a second control, and
wherein the first control is a control of an advance angle of the drive signal, for the advance angle of a timing after a predetermined phase, based on the signal output from the detection unit and the second control is a control of an amplitude of the drive signal based on the signal output from the detection unit.

19. The control device according to claim 18, wherein the control unit performs the first control and the second control in parallel so as to achieve the target rotation of the rotor.

20. The control device according to claim 18, wherein the control unit performs the first control based on correspondence information between the advance angle and the rotation, which is stored in a storage unit in advance.

21. The control device according to claim 18, wherein the control unit performs the second control within a predetermined range of voltage.

22. The control device according to claim 18, wherein the control unit controls a drive voltage supplied by the drive unit based on a velocity deviation of the rotation detected by the detection unit.

23. The control device according to claim 19, wherein the correspondence information in a predetermined range of the rotation is information corresponding to a drive voltage which is a median of a control range of a drive voltage set by the control unit.

24. The control device according to claim 22, wherein the storage unit stores the correspondence information corresponding to each of a predetermined plurality of drive voltages, and
wherein, when the velocity deviation does not fall within a range of a predetermined threshold value, the control unit changes the drive voltage to a voltage value that the velocity deviation falls within the range of the threshold value with reference to the correspondence information stored in the storage unit.

25. The control device according to claim 18, wherein the correspondence information in the predetermined range of the rotation is mathematical formula data indicating a correspondence relationship between the advance angle and the rotation.

26. The control device according to claim 18, wherein the correspondence information in the predetermined range of the rotation is a trajectory indicating a correspondence relationship between the advance angle and the rotation on a graph indicating the relationship between the advance angle and the rotation, and
wherein the mathematical formula data is linear approximation formula calculated on the basis of the trajectory.

27. An optical apparatus comprising:
the control device according to claim 18; and
an optical member.

28. An imaging apparatus comprising:
the control device according to claim 18; and
a sensor.

29. The control device according to claim 18, wherein the detection unit detects a velocity of the rotor in accordance with a signal that is changed in association with the rotation of the rotor.

30. The control device according to claim 18, wherein the detection unit detects a velocity of the rotor in accordance with output signals from photo interrupters, wherein the photo interrupters detect a signal that is changed in association with the rotation of the rotor.

31. The control device according to claim 18, wherein the second control is a control of a voltage of the drive signal.

32. The control device according to claim 18, further comprising:
a second detection unit configured to detect a rotation velocity of the rotor in according to the signal output the detection unit.

33. The control device according to claim 18, wherein the second control controls amplitude of the drive signal based on a difference between the rotation velocity detected by the detection unit and the target rotation velocity.

34. The control device according to claim 18, wherein the second control for a change of the signal output from the detection unit is more sensitive than the first control for a change of the signal output from the detection unit.

35. A method for controlling a motor control device, the method comprising:
rotating, by a drive unit, a rotor by supplying a drive voltage with periodical changes to a coil;
outputting, by a detection unit, a signal according to a rotation of the rotor; and
controlling, by a control unit, the drive voltage supplied by the drive unit,
wherein the control unit performs a first control and a second control, and
wherein the first control is a control of an advance angle of the drive voltage, for the advance angle of a timing after a predetermined cycle, based on the signal output from the detection unit and the second control is a control of an amplitude of the drive voltage based on the signal output from the detection unit.

* * * * *